United States Patent [19]

Lorenzen

[11] Patent Number: 5,019,250
[45] Date of Patent: May 28, 1991

[54] AUTOMATIC CHEMICAL DISPENSER

[76] Inventor: Walter C. Lorenzen, P.O. Box 443, Avalon, Catalina Island, Calif. 90704

[21] Appl. No.: 404,866

[22] Filed: Sep. 8, 1989

[51] Int. Cl.$^5$ .............................................. B01D 35/00
[52] U.S. Cl. ........................................ 210/85; 210/104; 210/127; 210/143; 210/169; 210/205; 222/453
[58] Field of Search ................ 137/268; 210/123, 127, 210/169, 205, 207, 208, 85, 143; 222/453, 476, 504

[56] References Cited

U.S. PATENT DOCUMENTS

| | | |
|---|---|---|
| 852,074 | 4/1907 | Morrison . |
| 2,054,881 | 9/1936 | Saunders ........................ 222/453 X |
| 2,097,813 | 11/1937 | Gollings ......................... 222/453 X |
| 2,233,818 | 3/1941 | Matter ............................. 137/34.2 |
| 2,248,958 | 7/1941 | Christensen et al. ............... 221/114 |
| 2,366,343 | 1/1945 | Ludwig ............................ 222/230 |
| 2,521,347 | 9/1950 | Davis .................................. 210/55 |
| 2,723,057 | 11/1955 | Golden ............................ 222/453 X |
| 2,825,491 | 3/1958 | Engstrom ........................... 222/133 |
| 3,128,915 | 4/1964 | Matter .............................. 222/156 |
| 3,141,585 | 6/1962 | Emmert ............................ 222/434 |
| 3,232,498 | 2/1966 | Bennett ............................. 222/449 |
| 3,595,395 | 7/1971 | Lorenzen ........................... 210/169 |
| 3,626,972 | 12/1971 | Lorenzen ........................... 137/268 |
| 3,638,833 | 2/1972 | Lucas ............................ 210/123 X |
| 3,666,150 | 5/1972 | Liljeholm et al. .................. 222/453 |
| 3,710,817 | 1/1973 | Lorenzen ........................... 137/268 |
| 3,727,632 | 4/1973 | Pansini ............................. 137/268 |
| 3,913,807 | 10/1975 | Lale et al. ...................... 222/453 X |
| 4,363,728 | 12/1982 | Guglielmi et al. ................. 210/205 |

FOREIGN PATENT DOCUMENTS

| | | | |
|---|---|---|---|
| 3411200 | 10/1985 | Fed. Rep. of Germany ...... 222/476 |
| 3511507 | 10/1986 | Fed. Rep. of Germany ...... 222/453 |
| 815715 | 7/1937 | France ............................... 222/453 |

*Primary Examiner*—Robert Spitzer
*Attorney, Agent, or Firm*—Fulwider, Patton, Lee & Utecht

[57] ABSTRACT

An automated chemical dispenser for the dispensation of a chemical into a liquid whereby premature contact of the chemical with the liquid's condensate is to be avoided. The device is, for example, especially well suited for the dispensation of sodium dichlor granules into swimming pool water as it is not susceptible to malfunction due to encrustment. A ganged valve arrangement is actuated from above to prevent any deposition of chemical on the actuation mechanism and thereby allows the chemical to freely drop into water filling a mixing basin situated directly therebelow. The actuation of critical valves at the proper moment and in a preselected sequence is governed by a controller that is preferably prompted by a sensor probe disposed within the dispenser that is capable of accurately monitoring the chemical's concentration within the pool.

18 Claims, 2 Drawing Sheets

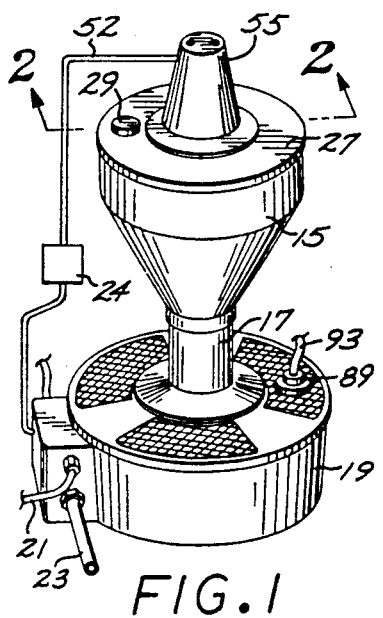
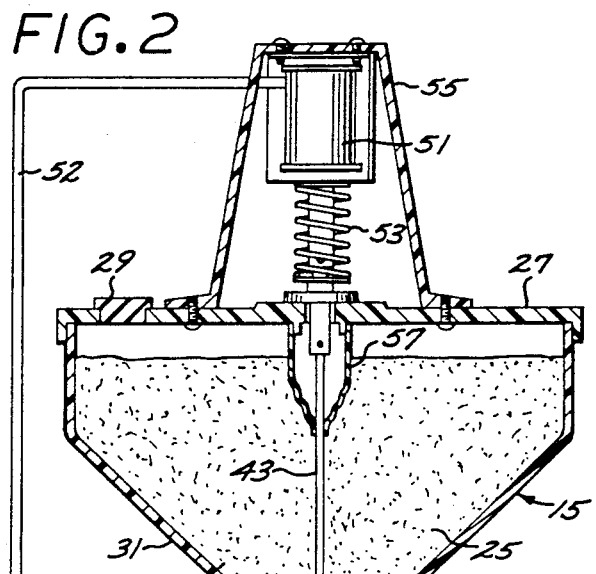
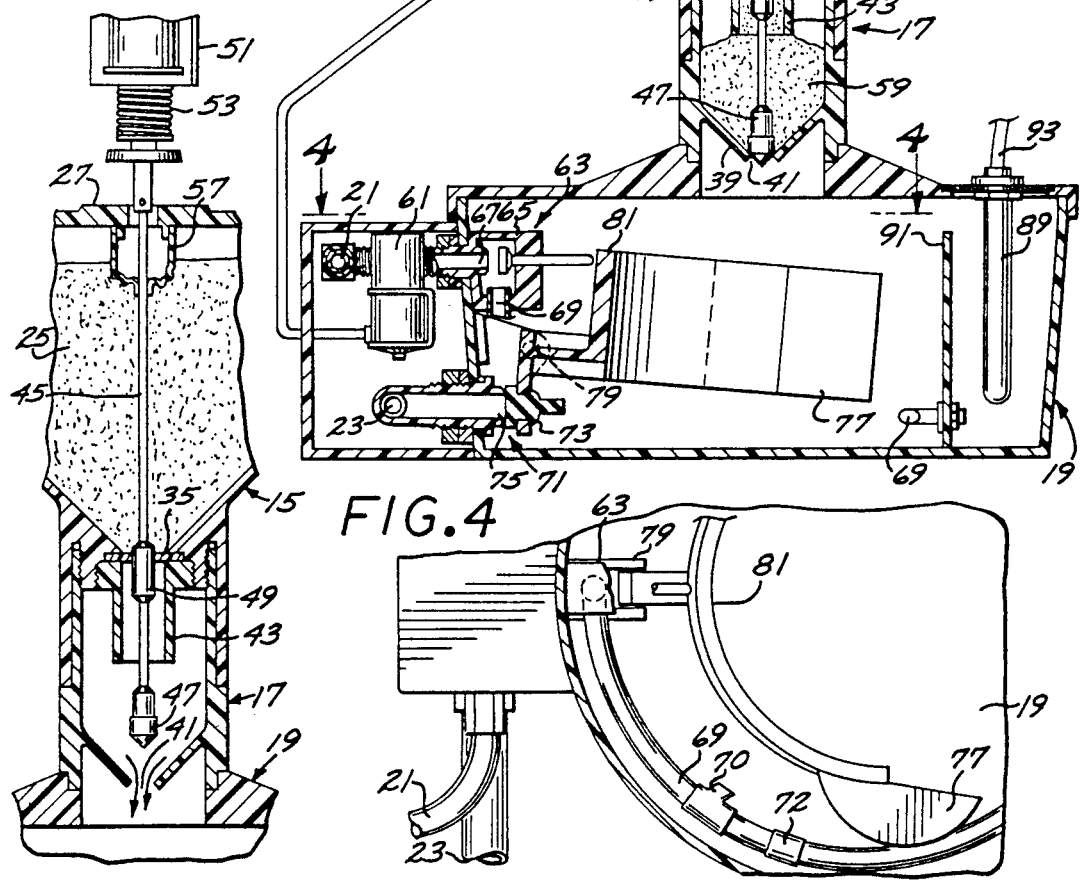

AUTOMATIC CHEMICAL DISPENSER

BACKGROUND OF THE INVENTION

1. Field of the Invention

This invention relates to chemical dispensers, and more particularly, pertains to improvements in automated pool treatment systems.

2. Description of the Prior Art

Chlorine and other chemicals are used in swimming pools and spas to control growth of algae and other organisms therein Additional chemicals are used to regulate the water's pH. The chlorine concentration must be maintained in a range below the level harmful to pool users, and above the minimum level effective to eliminate the undesired organic growth. Similarly, only a relatively narrow range of pH can be comfortably tolerated by the pool users. A number of different factors all contribute to the continual decline of the critical chemical concentration levels and periodical replenishment is therefore necessary.

Heretofore disclosed systems have provided semi-automated and fully automated systems to achieve this function. Aside from the problems associated with dispensing the proper amount of chemical at the appropriate time, many complications arise in trying to provide a system capable of functioning in a reliable, trouble-free manner for extended periods of time. The dispensation of chemicals in solid form into water, especially water at elevated temperatures, often results in encrustment, blockage and ultimate failure of the equipment.

For example, a particular situation often encountered in the chlorination of pools and spas involves the dispensation of sodium dichlor in its dry powdered or granulated form. Sodium dichlor contains about 56% active chlorine plus cyanuric stabilizer and is a desired vehicle for introducing chlorine into the water because of its almost neutral pH (6.5) and high solubility. Its extremely hydrophilic nature, however, tends to attract and absorb water which causes it to become extremely sticky. The moisture-laden chemical has the tendency to adhere to various surfaces and over time forms a thicker and thicker crust thereon which can ultimately debilitate or block various mechanisms and functions associated with such surfaces. A condition compounding the encrustment problem in spa systems is inherent in the fact that the water is heated substantially above ambient. Under such conditions it is more likely that condensate forms on the various components, and consequently, the chemical is more likely to be attracted and adhere thereto. The prior art has not adequately addressed this problem and an improved system is called for that is not susceptible to encrustment or clogging.

A number of different methods have been employed to control the rate of chemical dispensation in such automated devices. Typically a batch process is used whereby a preset amount of chemical is dispensed with each dispensation cycle while the cycling rate is controlled either by a timer or other control means. It may be desirable to alter or fine tune the amount of chemical dispensed during each cycle and it is here that a similar improvement over the prior art is called for wherein the amount dispensed is quickly and easily alterable by a mechanism that is not susceptible to encrustment or blockage.

Sensors that monitor chlorine content or pH are often employed to control the dispensation of the appropriate chemical. It is most desirable to integrate such a sensor within the chemical dispensation system itself in such a manner so as to provide accurate results and avoid the complexity associated with the fitment of a sensor to existing pool or spa hardware.

SUMMARY OF THE INVENTION

The present invention provides an automatic chemical dispenser, especially adaptable for the chlorination or pH control of a swimming pool or spa, employing an actuation mechanism that is not susceptible to encrustment or blockage by the chemical being dispensed. The chemical is dispensed in a batch process and a mechanism, similarly not susceptible to encrustment or blockage, is provided by which the amount of chemical dispensed during each dispensation cycle can be quickly and easily altered.

More specifically, a mixing basin is provided into which water from a pool or spa is periodically diverted, circulated there-through and returned. A means such as a float and valve system is provided to maintain a preselected water level in the basin. In new pool or spa installations, where incorporation of a standpipe is feasible, a gravity feed configuration is preferred obviating the need for the added complexity of the float and valve system. Upon actuation of a ganged double valve arrangement, a first valve opens to allow the contents of a metering chamber to freely drop into the mixing basin situated directly therebelow. A second valve simultaneously seals the outlet of a hopper situated directly above the metering chamber. Subsequent release by the actuation mechanism allows the first valve to reseal the outlet of the metering chamber while the second valve reopens to allow free communication of the hopper with the chamber. The configuration of the metering chamber, in conjunction with the selected length of an interchangeable adjustment tube, protruding into the chamber from the hopper, allows only a preselected amount of chemical to enter the chamber. The tube is easily exchanged for a shorter or longer tube which serves to respectively increase or decrease the amount of chemical metered. The valve actuation mechanism is so positioned and configured such that no part thereof comes in contact both with the chemical as well as heavily moisture-laden air. Encrustment of the mechanism and malfunction of the device due to a blockage is thereby effectively prevented. More particularly, this is achieved by positioning the actuator above the hopper with a connecting rod depending therefrom extending down through the interior of the hopper and metering chamber to control the position of both the hopper outlet valve as well as the metering chamber outlet valve. In addition, the first valve is normally held in a closed position by spring tension thereby effectively sealing the chemical-containing interior portions of the dispenser from the effects of moist air present above the liquid in the mixing basin. The first valve is opened for only a relatively brief period of time while the contents of the metering chamber drops into the mixing basin. The timing of these events is coordinated to minimize the formation of condensate during the brief time that the first valve is open. More particularly, prior to actually opening the first valve, the water within the mixing basin is allowed to cool substantially to ambient temperatures, thereby reducing the moisture content of the air directly there above. Means are additionally provided to prevent splashing or spraying of water entering the basin to minimize the amount of moisture clinging to the various surfaces.

A number of different means may be employed to initiate the valving sequence. For instance, the dispensation of chemical can be controlled manually, by a timer or preferably, by an automatic controller which monitors the concentration of the chemical in the pool or spa and causes chemical to be dispensed when readings drop below accepted levels. The sensor probe is preferably integrated into the dispenser of the present invention in order to avoid the complexity of otherwise incurred when fitting such a sensor to an existing pool installation. The probe extends down into a dammed area within the dispenser's mixing basin which is supplied with fresh water directly from the pool to assure an accurate reading of the pool's chemical concentration.

Other features and advantages of the present invention will become apparent from the following detailed description taken in conjunction with the accompanying drawings which illustrate, by way of example, the principle of the invention.

BRIEF DESCRIPTION OF THE INVENTION

FIG. 1 is a perspective view of the chemical dispenser of the present invention;

FIG. 2 is an enlarged cross-sectional view taken along lines 2—2 of FIG. 1

FIG. 3 is a partial cross-sectional view of the device in its dispensing mode;

FIG. 4 is a partial top plan view taken along lines 4—4 of FIG. 2; and

DETAILED DESCRIPTION OF THE INVENTION

Figure 5:
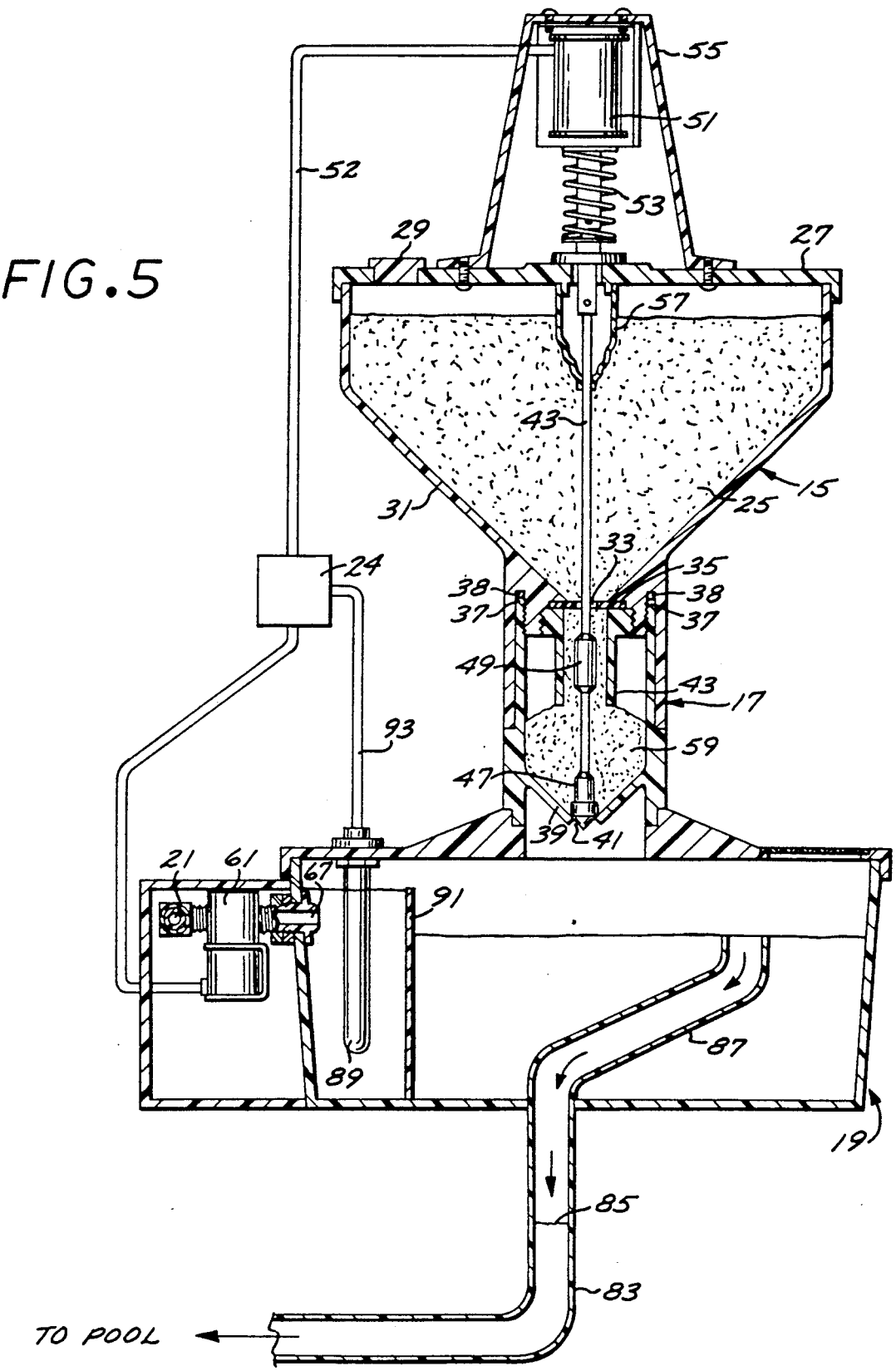
FIG. 5 is a partial cross-sectional view of an alternative embodiment of the present invention.

The device of the present invention can be advantageously employed for the dispensation of a substance in either its liquid or solid phase into a receiving liquid whereby a premature interaction between the substance and the receiving liquid's condensate in and around the dispenser is to be avoided. A particularly well-suited operation is the dispensation of a dry powdered or granulated solid into a liquid especially where condensation of the liquid in combination with the hydrophilicity of the solid can pose an encrustment or blockage problem. The preferred application of the device is in the controlled release of sodium dichlor granules or powder into a swimming pool or spa.

The present invention contemplates the described chemical dispenser's use with a pool's circulation system having a pump joined to suction and return lines. A portion of the returning water is diverted to the chemical dispenser, infused with the appropriate amount of chemical at the appropriate time and returned to either the pool's circulation system, or directly into the pool.

FIG. 1 illustrates the chemical dispenser in perspective. A hopper 15, sufficiently voluminous to store a substantial amount of chemical, is positioned above and affixed to a metering chamber 17, which in turn is positioned above and affixed to a mixing basin 19. Water from the pool's circulation system enters mixing basin 19 via conduit 21 and is subsequently returned to the pool's circulation system through return line 23. FIG. 5 illustrates an alternative embodiment wherein water is gravity fed directly back to the pool through a standpipe 83.

FIG. 2 is an enlarged cross-sectional representation of the device illustrated in perspective in FIG. 1. The relative positioning of the hopper 15, metering chamber 17 and mixing basin 19 is clearly illustrated therein. Hopper 15 is sufficiently voluminous to accommodate an amount of chemical 25 sufficient to maintain the chemical's concentration within the pool at a desired level for up to 3 months. The hopper 15 is sealed via a cover 27 having a sealable port 29 therein through which more chemical can periodically be introduced to refill the hopper 15. The walls 31 of hopper 15 converge toward hopper outlet 33. A valve seat 35 is positioned within the hopper outlet 33.

Directly below the hopper 15 and sealingly attached thereto is the metering chamber 17. A preferred mode of engaging the hopper is a sleeved fit substantially as illustrated wherein a threaded portion of the metering chamber 17 is received by a threaded groove 37 formed in the base of the hopper 15 accommodating a seal 38. The walls 39 of metering chamber 17 converge toward the center near the bottom of the chamber to promote the flow of chemical toward the chamber outlet 41. The chamber outlet 41 additionally serves as a valve seat. An interchangeable length of adjustment tube 43 is attached to the bottom of the hopper 15 and extends into the interior of the metering chamber 17. Adjustment tubes 43 of varying lengths can be interchanged for one another. The adjustment tubes are fitted to the hopper either by threaded means or an interference fit.

Extending down through the center of both the hopper 15 as well as the metering chamber 17 is a connecting rod 45 having attached thereto a first valve 49 for sealing the outlet 33 of metering chamber 17 and a second valve 47 for sealing the outlet 41 of hopper 15. Both valves 47 and 49 are rigidly affixed to the connecting rod 45 at positions such that when valve 47 sealingly engages the valve seat 41 the first valve 49 is in its opened position allowing free communication between hopper 15 and metering chamber 17. Alternatively, when the connecting rod 45 is pulled upwardly valve 47 assumes its open position while valve 49 sealing engages seat 33 to seal hopper 15. The connecting rod 45 is joined to a solenoid actuation device 51, which upon supply of electric current thereto via conductors 52, serves to pull up on connecting rod 45. A biasing spring 53 serves to bias the connecting rod 45 downwardly while the solenoid 51 is not energized. A rain cover 55 protects the solenoid 51 from the elements while a flexible boot 57, sealingly fitted to the interior of the upper cover 27 and about connecting rod 45, serves to provide the interior of the dispenser with an airtight seal.

Situated directly below the entire metering chamber 17 and hopper 15 assembly is the mixing basin 19. The mixing basin 19 is sufficiently voluminous to contain a quantity of water capable of dissolving a substantial amount of the metered chemical 59 when deposited therein. Line 21 taps into the pool's circulation system on its pressure side, while solenoid valve 61 controls the flow of water into mixing basin 19 when opened by controller 24. An additional inlet valve 63 limits the entry of water into mixing basin 19 when piston 65 is pushed against orifice 67. Water flowing past both of these valves (61, 63) is conducted toward the interior of mixing basin 19 via hose 69 and T-fitting 70. This arrangement prevents splashing or spraying of the incoming water onto the various surfaces normally above the water level within the basin. Outlet valve 71 allows water to return the pool via line 23 when piston 73 is retracted from orifice 75 within outlet valve 71. A float 77 disposed within the interior of mixing basin 19 is hingeably supported via lever 81 attached at 79 and is disposed and weighted such that when the water level within mixing basin 19 approaches a preselected level, both valves are opened. When the water level is too high inlet valve 63 is closed, when the water level is too low outlet valve 71 is closed.

FIG. 5 illustrates an alternative embodiment preferred when the incorporation of a standpipe 83 is feasible, such as during the new construction of the pool or spa. The standpipe 83 accesses the pool below its surface and extends upwardly to above the pool's water level. The level of the pool water is of course automatically maintained within the standpipe 83 at 85. This arrangement obviates the need for the float and limiting valve system shown in FIGS. 2 & 4 as the water level within the basin is automatically maintained at the height of the standpipe extension 87.

Controller 24 controls the function of both the actuation solenoid 51 as well as solenoid valve 61 in a preselected sequence and timing. Actuation may be triggered by either a manual switch, a time clock, or preferably, by a sensor which monitors the chemical concentration of the pool and sends a signal when such level falls below a preselected concentration.

FIGS. 4 & 5 additionally illustrate a preferred embodiment of the present invention incorporating a sensor probe. Probe 89 extends into the mixing basin behind dam 91 which rises higher than the maximum water level maintained either by the float and valve system of FIG. 2 and 4, or the standpipe/gravity feed system illustrated in FIG. 5. Fresh water diverted from the pool and admitted by solenoid valve 61 fills the dammed area, either directly as in FIG. 5 or through hose 69 in FIG. 4. Check valve 72 prevents the return of water from behind the dammed area to the mixing basin via hose 69 when valve 61 or 63 is closed. Water admitted into the dammed area flows past the probe 89 and drops into the mixing basin 19. Conductors 93 feed the relevant information to controller where a determination of whether to actuate solenoid 51 is made. Probes for measuring chlorine content or pH are readily commercially available.

In use, hopper 15 is first filled with a quantity of chemical through port 29 which is subsequently sealed. When solenoid 51 is in its unenergized or relaxed position, spring 53 serves to push connecting rod 45 downwardly to push the metering chamber's 17 outlet valve 47 into its closed or sealed position against valve seat 41. This position translates into an open position for valve 49 which allows the free flow of chemical 25 from hopper 15 into metering chamber 17. The length of a particular adjustment tube 43 fitted to the hopper 15 dictates the amount of chemical admitted into metering chamber 17. A shorter tube will allow more chemical to enter metering chamber, while a longer tube will reduce the amount of metered chemical 59. The adjustment tube 43 can be exchanged for one of a different length by detaching and lifting hopper 15 clear of the metering chamber 17 to provide direct access to the adjustment tube.

Whenever it is determined that a dispensation cycle is in order, the controller 24 is prompted via a signal from either a manual switch, time clock, or sensor to energize solenoid actuator 51 which retracts connecting rod 45 upwardly. This serves the dual function of simultaneously sealing the outlet of hopper 15 as valve 49 engages valve seat 33 and additionally opens outlet 41 of metering chamber 17 by moving valve 47 upwardly. The contents 59 of metering chamber 17 freely drops directly into the water contained in mixing basin 19. Upon the emptying of metering chamber 17 the solenoid actuator 51 is promptly deenergized allowing biasing spring 53 to force the closure of valve 47 against seat 41. This again opens valve 49 and allows a preselected amount of chemical to enter metering chamber 17 as before in preparation for the subsequent dispensation cycle. When hot water is being treated, controller 24 is programmed to ensure that this actuation of solenoid 51 is undertaken only after a preselected amount of time has passed since water had previously circulated through mixing basin 19 in order to allow such water to achieve substantially ambient temperature. This has the effect of reducing the amount of moisture in the air directly above the water and therefore allows only a negligible amount of moisture to enter metering chamber 17 during the brief period of time when valve 47 is opened. Additionally, the arrangement illustrated in FIG. 2, wherein water entering mixing basin 19 is diverted to the bottom via hose 69, prevents the entering water from spraying or splashing onto surfaces normally above the water level within the mixing basin and thereby reduces the amount of chemical-attracting moisture clinging to various surfaces. As the water level increases within mixing basin 19, the level of the float 77 rises causing lever 81 to engage piston 65 to close the inlet valve 63 as the piston 65 contacts orifice 67. This motion of the float 77 and lever 81 arrangement causes the retraction of piston 73 allowing the now chemical-laden water to return via line 23 to the pool via the pool's circulation system. As the water level decreases the float 77 and lever 81 arrangement lowers to close outlet valve 71 and open inlet valve 63. The inlet and outlet valve configurations and interaction with said lever and float arrangement maintains a desired level within mixing basin 19. Once a sufficient amount of water has circulated through mixing basin 19 to deplete the chemical concentration within mixing basin 19, the controller 24 closes valve 61 once again to complete the dispensation cycle. As previously noted, the controller 24 prevents reactuation of solenoid 51 until a sufficient period of time has passed to allow water within mixing basin 19 to cool to ambient temperatures. As is apparent in FIG. 4, it is to be additionally noted that lever 81 and float 77 are configured so as to avoid deposition of chemical thereon.

The alternative embodiment of FIG. 5 greatly simplifies the water level maintaining system. Water diverted to the dispenser and admitted by solenoid valve 61 simply exits through standpipe 83 when the level of standpipe extension 87 is exceeded. The extension 87 is configured to prevent deposition of chemical directly thereon. Chemical-laden water is gravity fed into the pool via standpipe 83.

FIGS. 4 and 5 additionally illustrate the fitment of a sensor probe 89 directly to the dispenser unit in such a manner to ensure that the readings therefrom reflect the chemical concentration found in the pool. This is achieved by segregating the probe 89 behind a dam 91 that rises higher than the water level maintained within the mixing basin 19. Only fresh water admitted via valve 61 therefore flows past the probe 89 over the dam 91 into the mixing basin 19, as the height difference precludes the flow of chemical-laden water towards the probe 89 and thereby prevents erroneously high readings. The controller 24 can be programmed to take advantage of this configuration by, for example, continuously allowing water to be admitted past solenoid valve 61 every time the pool's circulation system is operative or alternatively, in conformance to a preselected time schedule. In systems where condensate would not pose a problem, inclusion of valve 61 is not necessary. Whenever the sensor probe 89 senses a chemical level below a desired level, dispensation of a metered amount of chemical is effected. Subsequent dispensation cycles are delayed until the chemical-laden water introduced by the dispenser has had ample time to diffuse throughout the entire pool so that water diverted back to the dispenser and past the probe 89 reflects the chemical concentration of the entire pool.

In systems where condensate would pose a problem, care must be taken to ensure that the water within the mixing basin 19 is substantially at ambient temperature when valve 47 is opened. This can for example be achieved in a fully automated system wherein a clock (not shown) in conjunction with controller 24 open valve 61 only after a sufficient cooling off period has elapsed. The critical chemical contents of fresh water flowing past probe 89 is measured and if low, solenoid 51 is actuated for a relatively brief period of time to allow the metered amount of chemical to drop and before a sufficient amount of warm water has entered mixing basin 19 to appreciably raise its temperature above ambient. Water continues to be circulated through mixing basin 19 until the dispensed chemical has been conducted to the pool at which time valve 61 is closed. Initiation of a subsequent cycle is delayed until chemical-laden water emitted from the dispenser has had ample time to diffuse throughout the pool so that the chemical concentration measured by the probe 89 when valve 61 is reopened is a true indication of the total chemical concentration of the pool and until the water within mixing basin 19 has cooled substantially to ambient.

As is apparent from the structure described above and illustrated in the drawings the function of the chemical dispenser of the present invention is not susceptible to malfunction due to encrustment or blockage by chemical 25. No surfaces are provided upon which water can condense and which are subsequently contacted by the chemical. In addition, the influx of moist air into the interior of the metering chamber is minimized by briefly opening the outlet valve only after the water directly thereunder has cooled. Consequently a hydrophilic chemical is not presented with the opportunity to absorb moisture, become sticky and adhere to any surface that would impede the function of the device.

Construction materials for the above described chemical dispenser are selected such that corrosion is effectively eliminated. To that end, it has been found that for the dispensation of sodium dichlor into pool water, most components of this system can be made of acrylic plastic. This includes such components as the hopper 15, metering chamber 17 as well as mixing basin 19. Where metallic components are required, the use of stainless steel is preferred. Additionally, it has been found that the connecting rod 45 is especially susceptible to corrosion therefore the use of titanium is preferred as it is impervious to the effects of chlorine.

While a particular form of the invention has been illustrated and described, it will also be apparent that various modifications can be made without departing from the spirit and scope of the invention. More particularly, the invention should not be limited to the dispensation of sodium dichlor into pool water or even the dispensation of solids into liquids, but rather dispensation of any chemical, including a chemical in its liquid phase, in which reaction with condensed moisture can have deleterious effects on the mechanism. Accordingly, it is not intended that the invention be limited except as by the appended claims.

What is claimed is:

1. An apparatus for introducing a preselected quantity of chemical into a body of liquid comprising:
   a hopper for storing a substantial quantity of such chemical, said hopper having an outlet;
   a first valve for sealing said hopper outlet;
   a metering chamber disposed directly below said hopper outlet and configured to receive a preselected quantity of chemical from said hopper upon opening said first valve, said metering chamber having an outlet;
   a second valve for sealing said metering chamber outlet;
   a mixing basin disposed directly below said metering chamber outlet, said mixing basin incorporating means for maintaining a preselected level of liquid therein;
   means for directing liquid from such body of liquid to said mixing basin and means for returning liquid from said mixing basin to such body of liquid;
   a connecting rod extending down through the interior of said hopper and into said metering chamber to which said first and said second valves are rigidly affixed in a ganged relationship such that when said rod is pulled upwardly, said first valve seals said hopper outlet while said second valve simultaneously opens said metering chamber's outlet and when said connecting rod is pushed downwardly, said first valve opens said hopper outlet while said second valve simultaneously seals the metering chamber outlet;
   actuation means for normally pushing said connecting rod downwardly and upon actuation, pulling said connecting rod upwardly.

2. The apparatus of claim 1 wherein said actuation means comprises a spring-loaded electrically actuated solenoid.

3. The apparatus of claim 2 further comprising a concentration sensor capable of monitoring such body of liquid's chemical concentration and a controller, said controller responsive to said sensor and operative to energize said solenoid when said sensor indicates a concentration below a preselected value.

4. The apparatus of claim 3 wherein said mixing basin has a segregated area therein which receives said liquid directed to said mixing basin from such body of liquid and allows said liquid to attain a level higher than said maintained preselected level within said mixing basin before spilling over into said mixing basin, said segregated area further accommodating said concentration sensor.

5. The apparatus of claim 2 wherein said metering chamber comprises: an interchangeable tube engaging said hopper outlet and extending downwardly into the interior of said metering chamber whereby the length of said tube determines the quantity of chemical admitted into said metering chamber from said hopper upon actuation of said actuation means.

6. The apparatus of claim 2 wherein a circulation system having a pressure side and a suction side serves to circulate liquid in said body of liquid and a first conduit extending from the pressure side of said system to the mixing basin serves to direct liquid to the mixing basin and a second conduit extending from the mixing basin to the suction side of said system serves to return liquid to such body of liquid.

7. The apparatus of claim 6 wherein a float and two float actuated valves control the flow of liquid into and out of said mixing basin to thereby maintain a preselected level of liquid therein.

8. The apparatus of claim 6 further comprising means to direct liquid entering said basin to below the preselected level of liquid maintained within said basin.

9. The apparatus of claim 6 wherein a third valve controls the flow of liquid into said mixing basin.

10. The apparatus of claim 9 further comprising a concentration sensor capable of measuring such body of liquid's chemical concentration and a controller, said controller operative to open said third valve after a preselected period of time, to energize said solenoid shortly after opening said third valve for a second preselected period of time if said sensor measures a chemical concentration below a preselected level and to close said third valve after passage of a third preselected period of time.

11. The apparatus of claim 2 wherein a circulation system having a pressure side and a suction side circulates liquid in said body of liquid and a first conduit extending from the pressure side of said system to said mixing basin situated above the level of such body of liquid serves to direct liquid thereto and a standpipe extending from the mixing basin to the body of liquid serves to return liquid thereto via gravity.

12. The apparatus of claim 11 wherein an open end of said standpipe projects into said mixing basin to a preselected height whereby a water level corresponding to said preselected height is automatically maintained.

13. The apparatus of claim 11 wherein a third valve controls the flow of liquid into said mixing basin.

14. The apparatus of claim 13 further comprising a concentration sensor capable of monitoring such body of liquid's chemical concentration and a controller, said controller responsive to said sensor and operative to open said third valve after a preselected period of time, to energize said solenoid shortly after opening said third valve for a preselected second period of time if said sensor measures a chemical concentration has fallen below a preselected level, and operative to close said third valve after passage of a preselected third period of time.

15. An automated pool chlorinator for maintaining a preselected concentration of chlorine in a swimming pool, said swimming pool having a circulation system with a pressure side and a suction side comprising:
   a hopper for storing a substantial quantity of chlorine-releasing chemical, said hopper having an outlet;
   a first valve for sealing said hopper outlet;
   a metering chamber disposed directly below said hopper outlet, said metering chamber including an interchangeable tube for engaging said hopper outlet for controlling the amount of chlorine-releasing chemical received by said metering chamber upon opening said first valve, said metering chamber having an outlet;
   a second valve for sealing said metering chamber;
   a connecting rod extending down through the interior of said hopper and into said metering chamber to which said first and said second valves are rigidly affixed in a ganged relationship such that when said rod is pulled upwardly, said first valve seals said hopper outlet while said second valve simultaneously opens said metering chamber's outlet and when said connecting rod is pushed downwardly, said first valve opens said hopper outlet while said second valve simultaneously seals the metering chamber outlet;
   a spring loaded actuation solenoid configured to push said connecting rod downwardly and upon energization, pull said connecting rod upwardly;
   a mixing basin disposed directly below said metering chamber outlet, said mixing basin incorporating means for maintaining a preselected level of water therein, and said mixing basin further including a segregated area wherein a water level higher than said preselected level of water is maintained;
   means for directing water from the pressure side of such circulation system to the mixing basin via said segregated area and means for returning water from said mixing basin to such swimming pool;
   sensor means capable of measuring the chlorine content of water within said segregated area of said mixing basin; and
   control means responsive to said sensor means and operative to energize said solenoid when said sensor means measures a chlorine content below a preselected value.

16. The chlorinator of claim 15 wherein a solenoid operated third valve controls flow of water to said mixing basin and said control means is operative to open said third valve after a preselected period of time, to shortly thereafter open said solenoid for a preselected second period of time if said sensor means measures a chlorine content below a preselected value and to close said third valve after passage of a preselected third period of time.

17. An automated apparatus for maintaining a preselected pH in a swimming pool, said swimming pool having a circulation system with a pressure side and a suction side comprising:
   a hopper for storing a substantial quantity of pH-lowering chemical, said hopper having an outlet;
   a first valve for sealing said hopper outlet:
   a metering chamber disposed directly below said hopper outlet, said metering chamber including an interchangeable tube for engaging said hopper outlet for controlling the amount of pH-lowering chemical received by said metering chamber upon opening said first valve, said metering chamber having an outlet;
   a second valve for sealing said metering chamber;
   a connecting rod extending down through the interior of said hopper and into said metering chamber to which said first and said second valves are rigidly affixed in a ganged relationship such that when said rod is pulled upwardly, said first valve seals said hopper outlet while said second valve simultaneously opens said metering chamber's outlet and when said connecting rod is pushed downwardly, said first valve opens said hopper outlet while said second valve simultaneously seals the metering chamber outlet;

a spring loaded actuation solenoid configured to push said connecting rod downwardly and upon energization, pull said connecting rod upwardly;

a mixing basin disposed directly below said metering chamber outlet, said mixing basin incorporating means for maintaining a preselected level of water therein, and said mixing basin further including a segregated area wherein a water level higher than said preselected level of water is maintained;

means for directing water from the pressure side of such circulation system to the mixing basin via said segregated area and means for returning water from said mixing basin to such swimming pool;

sensor means capable of measuring the pH of water within said segregated area of said mixing basin; and control means responsive to said sensor means and operative to energize said solenoid when said sensor means measures a pH greater than a preselected value.

18. The apparatus of claim 17 wherein a solenoid operated third valve controls flow of water to said mixing basin and said control means is operative to open said third valve after a preselected period of time, to shortly thereafter open said solenoid for a preselected second period of time if said sensor means measures a preselected value and to close said third valve after passage of a preselected third period of time.

* * * * *